(12) United States Patent
Neil et al.

(10) Patent No.: US 12,733,087 B1
(45) Date of Patent: Sep. 8, 2026

(54) LIGHT SOURCE SYSTEM AND METHOD OF OPERATION

(71) Applicant: xLight Inc., Palo Alto, CA (US)

(72) Inventors: George Randall Neil, Palo Alto, CA (US); Gennady Stupakov, Palo Alto, CA (US); William Alexander Schumaker, Palo Alto, CA (US)

(73) Assignee: xLight Inc., Palo Alto, CA (US)

( * ) Notice: Subject to any disclaimer, the term of this patent is extended or adjusted under 35 U.S.C. 154(b) by 122 days.

(21) Appl. No.: 18/908,164

(22) Filed: Oct. 7, 2024

Related U.S. Application Data

(60) Provisional application No. 63/590,745, filed on Oct. 16, 2023.

(51) Int. Cl.

| | |
|---|---|
| ***H05G 2/00*** | (2006.01) |
| *H01S 3/09* | (2006.01) |
| *H01S 4/00* | (2006.01) |

(52) U.S. Cl.
CPC .............. *H05G 2/00* (2013.01); *H01S 3/0903* (2013.01); *H01S 4/00* (2013.01)

(58) Field of Classification Search
CPC .................................... H05G 2/00; H01S 4/00
See application file for complete search history.

(56) References Cited

U.S. PATENT DOCUMENTS

| | | | | |
|---|---|---|---|---|
| 2014/0270086 | A1* | 9/2014 | Krasnykh | H05G 2/00 378/124 |
| 2017/0003597 | A1* | 1/2017 | Patra | H01S 3/0903 |
| 2017/0019982 | A1* | 1/2017 | Hosler | H05G 2/00 |

* cited by examiner

*Primary Examiner* — Chih-Cheng Kao
(74) *Attorney, Agent, or Firm* — Jeffrey Schox; Samuel Rosenthal

(57) ABSTRACT

A radiator system, preferably including one or more undulator regions, beam separators, and/or sets of optics. The radiator system is preferably integrated into a light source system, which can include one or more accelerator modules and/or radiator systems. The light source system preferably defines a free-electron laser operable to generate one or more optical outputs. A method of operation, preferably including receiving a high-energy electron beam, operating one or more beam modulators, and/or providing an optical output.

20 Claims, 7 Drawing Sheets

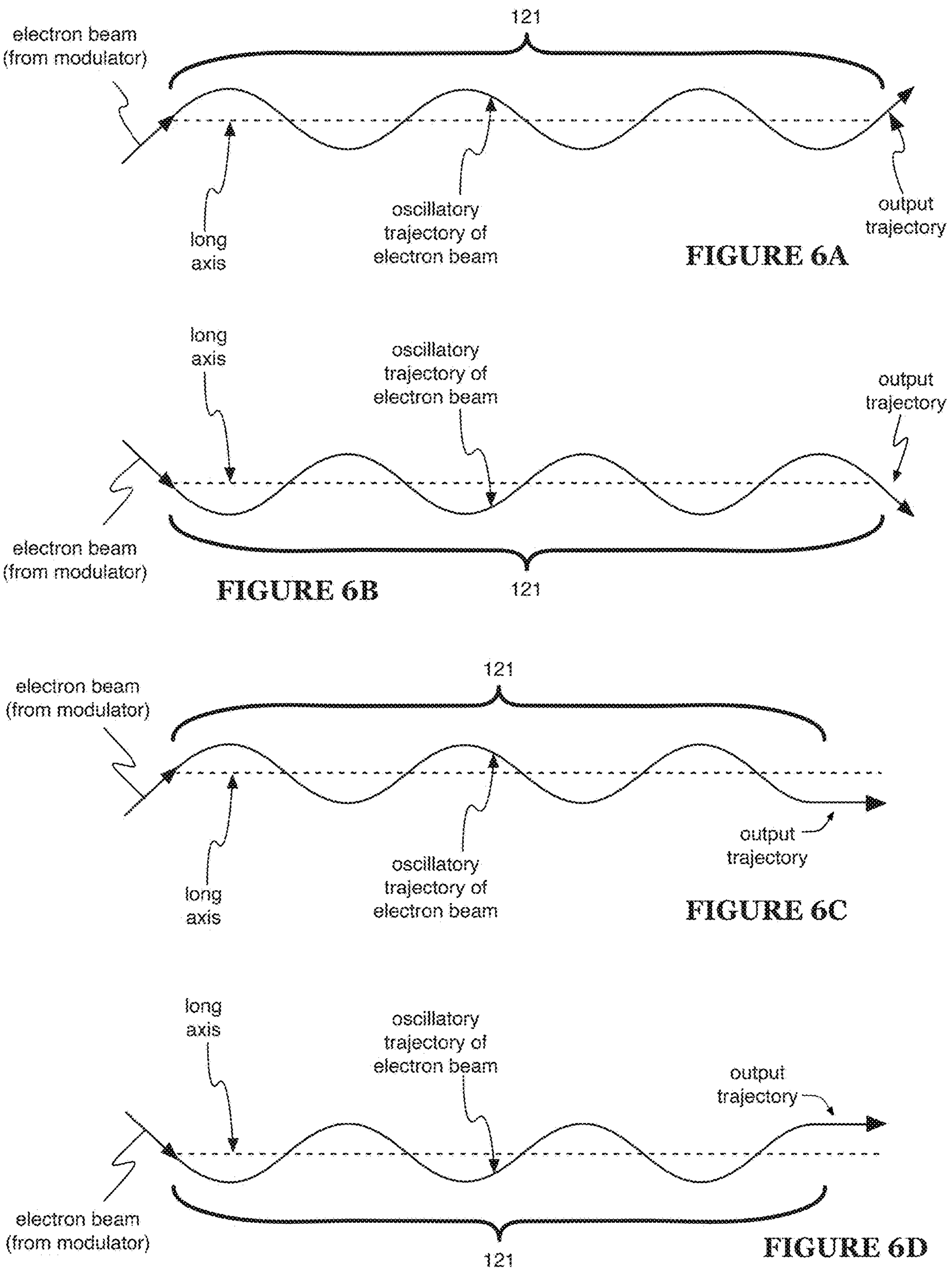
121
electron beam
(from modulator)
long
axis
oscillatory
trajectory of
electron beam
output
trajectory
FIGURE 6A
long
axis
oscillatory
trajectory of
electron beam
output
trajectory
electron beam
(from modulator)
FIGURE 6B
121
121
electron beam
(from modulator)
output
trajectory
long
axis
oscillatory
trajectory of
electron beam
FIGURE 6C
long
axis
oscillatory
trajectory of
electron beam
output
trajectory
electron beam
(from modulator)
121
FIGURE 6D

LIGHT SOURCE SYSTEM AND METHOD OF OPERATION

CROSS-REFERENCE TO RELATED APPLICATIONS

This application claims the benefit of U.S. Provisional Application Ser. No. 63/590,745, filed on 16 Oct. 2023, which is incorporated in its entirety by this reference.

TECHNICAL FIELD

This invention relates generally to the light source field, and more specifically to a new and useful light source system and method of operation.

BRIEF DESCRIPTION OF THE FIGURES

FIGS. 6A-6D are schematic representations of various examples of electron beam displacements consistent with the method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
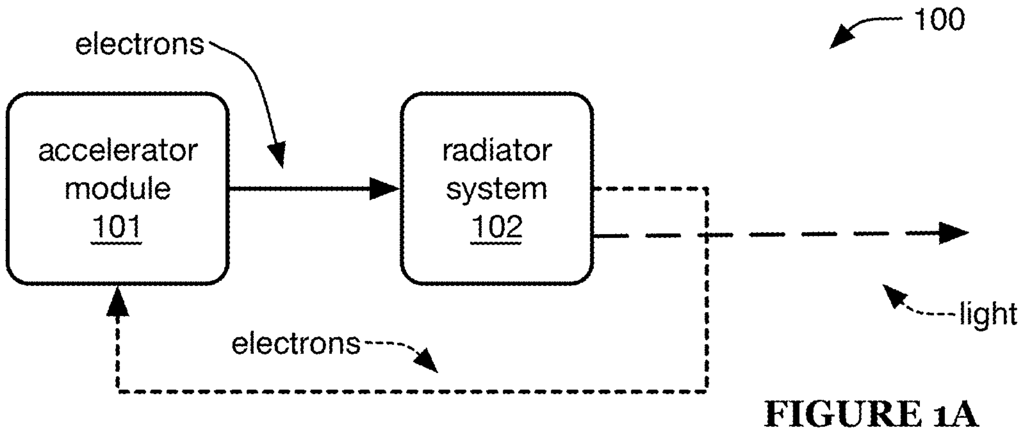
FIG. 1A is a schematic representation of an embodiment of a light source system.
Figure 1B:
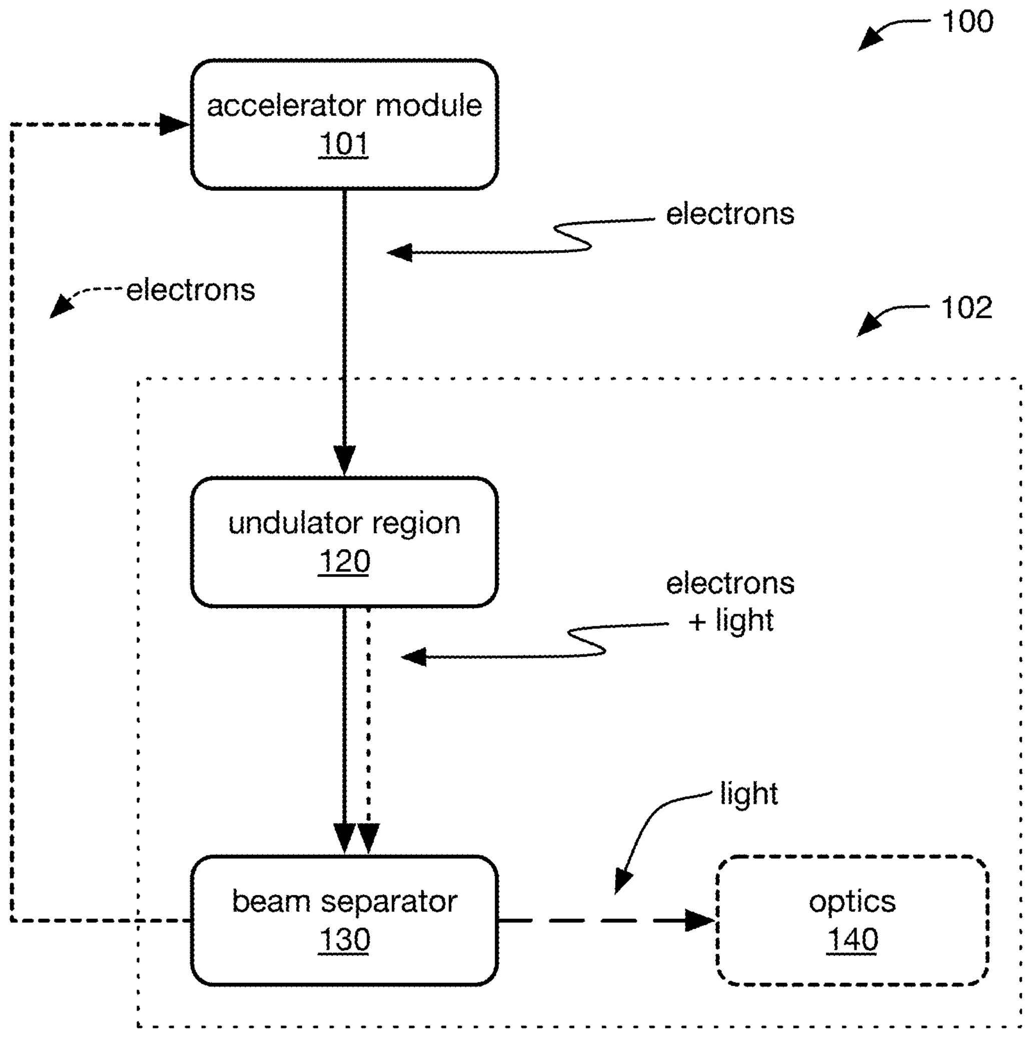
FIG. 1B is a schematic representation of a variant of a light source system.

A radiator system 102 preferably includes one or more undulator regions 120, beam separators 130, and/or sets of optics 140 (e.g., as shown in FIGS. 1B and/or 2). The radiator system is preferably configured to provide one or more electron beams to each of the one or more undulator regions. However, the radiator system can additionally or alternatively include any other suitable elements in any suitable arrangement. The radiator system preferably functions to receive an electron beam (e.g., from an accelerator module) and use it to generate one or more light outputs.

The radiator system 102 is preferably integrated into a light source system 100. The light source system 100 can include one or more accelerator modules 101 and/or radiator systems 102 (e.g., as shown in FIGS. 1A-1B). However, the light source system 100 can additionally or alternatively include any other suitable elements in any suitable arrangement.

The light source system preferably defines a free-electron laser (FEL) that generates (and/or is operable to generate) one or more optical outputs (e.g., EUV light output); however, the light source system can additionally or alternatively be configured in any other suitable manner. The light source system 100 and/or radiator system 102 is preferably configured to perform the method of operation described below; however, the light source system 100 and/or radiator system 102 can additionally or alternatively have any other suitable functionality and/or be configured in any other suitable manner.

Figure 3:
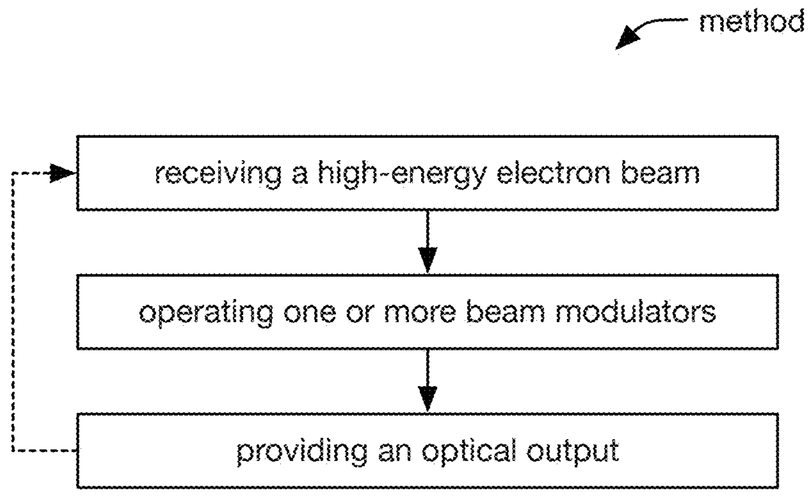
FIG. 3 is a flowchart representation of an embodiment of a method of operation.

A method of operation preferably includes receiving a high-energy electron beam, operating one or more beam modulators, and/or providing an optical output (e.g., as shown in FIG. 3). However, the method can additionally or alternatively include any other suitable elements performed in any suitable manner. The method is preferably performed using the light source system 100 and/or radiator system 102 described herein, but can additionally or alternatively be performed using any other suitable systems.

The light source system 100, radiator system 102, and/or method of operation preferably function to provide a light output (e.g., having spatial and/or temporal characteristics suitable and/or desirable for lithography applications, such as EUV lithography applications), such as one or more beams of light (e.g., spatially-separated light beams, preferably wherein each beam is collimated or substantially collimated, preferably wherein different beams can be directed toward endpoints). The light output is preferably polarized or substantially polarized (e.g., to facilitate use with semiconductor fab photolithography equipment, such as steppers and/or scanners), but can alternatively be unpolarized, partially polarized, or have any other suitable polarization; in some embodiments, some or all light beams can have different polarizations as compared with each other. The light output is preferably coherent or substantially coherent, but can alternatively be incoherent or have any other suitable coherency. However, the light output by the light source system can additionally or alternatively have any other suitable characteristics. In some embodiments, the light source system can define a free-electron laser (FEL) or a plurality of FELs (e.g., wherein each FEL of the output is configured to output a separate beam of light), such as wherein the light preferably has spatial and/or temporal characteristics suitable and/or desirable for lithography applications, such as EUV lithography applications.

The light output preferably has high photon energy, such as being EUV light (e.g., 13.5 nm, 6.7 nm, etc.), X-ray light, and/or any other suitable high-energy light, but can additionally or alternatively have any other suitable photon energy. In examples, the light output can be X-ray light (e.g., 5 nm, 1 nm, 0.1 nm, 0.01-0.1 nm, 0.1-0.2 nm, 0.2-0.5 nm, 0.5-1 nm, 1-2 nm, 2-5 nm, etc.), UV light, preferably EUV light (e.g., 13.5 nm, 6.7 nm, 5-8 nm, 8-15 nm, 15-30 nm, 30-121 nm, etc.) but additionally or alternatively any other suitable UV light (e.g., 100-280 nm, 280-315 nm, 315-400 nm, etc.), and/or any other suitable high-energy light, but can additionally or alternatively have any other suitable photon energy (e.g., visible light such as light having a wavelength in the 400-750 nm range, infrared light such as light having a wavelength in the 0.75-15 μm range and/or the 15-1000 μm range, millimeter-wave radiation such as light having a wavelength in the 1-10 mm range, etc.); a person of skill in the art will recognize that, although the wavelength of light may vary depending on the medium through which it propagates, the wavelengths described herein typically refer to the photon wavelength in a vacuum (the 'free-space photon wavelength'). The light output is preferably substantially monochromatic (e.g., having a bandwidth less than 1, 0.5, 0.3, 0.2, 0.1 nm, or less, less than 10%, 5%, 2%, 1%, or less of the nominal or central wavelength, etc.), but can alternatively have any other suitable bandwidth.

However, the light output by the light source system 100 and/or radiator system 102 can additionally or alternatively have any other suitable characteristics.

In some embodiments, the light source system 100, accelerator module 101, radiator system 102, and/or method of operation (and/or any suitable elements thereof) can include one or more elements (and/or any suitable aspects thereof) such as described in U.S. patent application Ser. No. 14/803,068, filed 18 Jul. 2015 and titled "METHOD, APPARATUS AND SYSTEM FOR PROVIDING MULTIPLE EUV BEAMS FOR SEMICONDUCTOR PROCESSING", U.S. Pat. No. 9,541,839, granted 10 Jan. 2017 and titled "METHOD AND DEVICE FOR SPLITTING A HIGH-POWER LIGHT BEAM TO PROVIDE SIMULTANEOUS SUB-BEAMS TO PHOTOLITHOGRAPHY SCANNERS", U.S. Pat. No. 9,392,679, granted 12 Jul. 2016 and titled "METHOD, APPARATUS AND SYSTEM FOR USING FREE-ELECTRON LASER COMPATIBLE EUV BEAM FOR SEMICONDUCTOR WAFER PROCESSING", and/or U.S. Pat. No. 9,844,124, granted 12 Dec. 2017 and titled "METHOD, APPARATUS AND SYSTEM FOR USING FREE-ELECTRON LASER COMPATIBLE EUV BEAM FOR SEMICONDUCTOR WAFER METROLOGY", each of which is herein incorporated in its entirety by this reference.

In some embodiments, the light source system 100, accelerator module 101, radiator system 102, and/or method of operation (and/or any suitable elements thereof) can include one or more elements (and/or any suitable aspects thereof) such as described in U.S. patent application Ser. No. 18/374,911, filed 29 Sep. 2023 and titled "POLARIZATION-MULTIPLEXED RADIATOR SYSTEM, LIGHT SOURCE SYSTEM, AND METHOD OF OPERATION", and/or in U.S. patent application Ser. No. 18/794,414, filed 5 Aug. 2024 and titled "LIGHT SOURCE SYSTEM AND METHOD OF OPERATION", each of which is herein incorporated in its entirety by this reference. For example, the radiator system 102 can include one or more elements such as described in U.S. patent application Ser. No. 18/374,911 (e.g., can include the entire 'radiator module 102' described therein, can include any suitable elements of the 'radiator module 102' described therein, etc.), and/or the accelerator module 101 can include one or more elements such as described in U.S. patent application Ser. No. 18/374,911 (e.g., can include the entire 'accelerator module 101' described therein, can include any suitable elements of the 'accelerator module 101' described therein, etc.). However, the redundant light source system 100 can additionally or alternatively include any other suitable elements in any suitable arrangement and/or having any other suitable functionality.

A person of skill in the art will recognize that, as used herein, the terms 'radiator system', 'radiator module', and the like can be interpreted to refer to items (e.g., systems, modules, etc.) including any suitable element(s) that emit (and/or are configured to emit) light, including any suitable undulator(s) used for free-electron lasing (e.g., undulator configured to receive high-energy electrons, generate microbunching in the electrons, and generate coherent radiation via free-electron lasing from the micro-bunched electrons; undulator configured to receive micro-bunched electrons, such as from a buncher undulator and/or any other suitable element(s), and generate coherent radiation via free-electron lasing from the micro-bunched electrons; etc.) and/or any other suitable structure(s), and is not necessarily limited to any particular kind of undulator; although the term 'radiator' may be used in certain communities to refer specifically to an undulator configured to receive micro-bunched electrons and generate coherent radiation via free-electron lasing from the micro-bunched electrons, the terms 'radiator', 'radiator system', 'radiator module', and the like, as used herein, should not be interpreted to carry any such specific limitation, but instead may refer to any of a broad variety of items including elements that emit (and/or are configured to emit) light.

2. System

2.1 Accelerator Module.

The light source system 100 preferably includes an accelerator module 101. The accelerator module 101 preferably functions to provide a beam 200 of high-energy (e.g., relativistic) electrons (e.g., to a radiator system 102). The accelerator module 101 can additionally or alternatively function to accept one or more electron beams (e.g., from the radiator module), such as after the electron beam(s) are used for lasing.

The electron beam 200 preferably includes a plurality of electron bunches (e.g., wherein the accelerator module is preferably a bunched-beam accelerator module, such as a radio-frequency (RF) accelerator module in which the accelerator drives the bunches using one or more RF fields), wherein each bunch preferably travels substantially along the input beam path and/or the output beam path (e.g., wherein the system may define a plurality of such input and/or output beam paths).

The electrons of each electron beam can define an electron energy (e.g., nominal electron energy), preferably on the order of hundreds of MeV (e.g., 600, 800, 1000, 1200, 1400, 300-100, and/or 1000-1300 MeV, etc). In a first specific example, an electron energy of 800 MeV can be used for generation of 13.5 nm light. In a second specific example, an electron energy of 1200 MeV can be used for generation of 6.7 nm light. However, the electrons can additionally or alternatively have any other suitable energy characteristics.

In some embodiments, the accelerator module 101 includes an electron beam injector and a linear accelerator system, and can optionally include an energy recovery system and/or an electron beam dump. In some such embodiments, the accelerator module 101 (and/or any elements thereof, including, without limitation, the electron beam injector, linear accelerator system, energy recovery system, and/or electron beam dump) can include one or more elements (and/or any suitable aspects thereof) such as described in U.S. patent application Ser. No. 14/803,068, filed 18 Jul. 2015 and titled "METHOD, APPARATUS AND SYSTEM FOR PROVIDING MULTIPLE EUV BEAMS FOR SEMICONDUCTOR PROCESSING", U.S. Pat. No. 9,541,839, granted 10 Jan. 2017 and titled "METHOD AND DEVICE FOR SPLITTING A HIGH-POWER LIGHT BEAM TO PROVIDE SIMULTANEOUS SUB-BEAMS TO PHOTOLITHOGRAPHY SCANNERS", U.S. Pat. No. 9,392,679, granted 12 Jul. 2016 and titled "METHOD, APPARATUS AND SYSTEM FOR USING FREE-ELECTRON LASER COMPATIBLE EUV BEAM FOR SEMICONDUCTOR WAFER PROCESSING", and/or U.S. Pat. No. 9,844,124, granted 12 Dec. 2017 and titled "METHOD, APPARATUS AND SYSTEM FOR USING FREE-ELECTRON LASER COMPATIBLE EUV BEAM FOR SEMICONDUCTOR WAFER METROLOGY", each of which is herein incorporated in its entirety by this reference. For example, the accelerator module 101 can include one or more elements such as described in U.S. patent application Ser. No. 14/803,068 regarding the 'superconducting accelerator' (e.g., the accelerator module 101 can be substantially identical to the 'superconducting accelerator' of U.S. patent application Ser. No. 14/803,068).

However, the accelerator module 101 can additionally or alternatively include any other suitable elements in any suitable arrangement.

2.2 Radiator System.

The redundant light source system 100 preferably a radiator system 102. The radiator system preferably functions to receive an electron beam (e.g., from the accelerator module 101) and use it to generate one or more light outputs.

Figure 2:
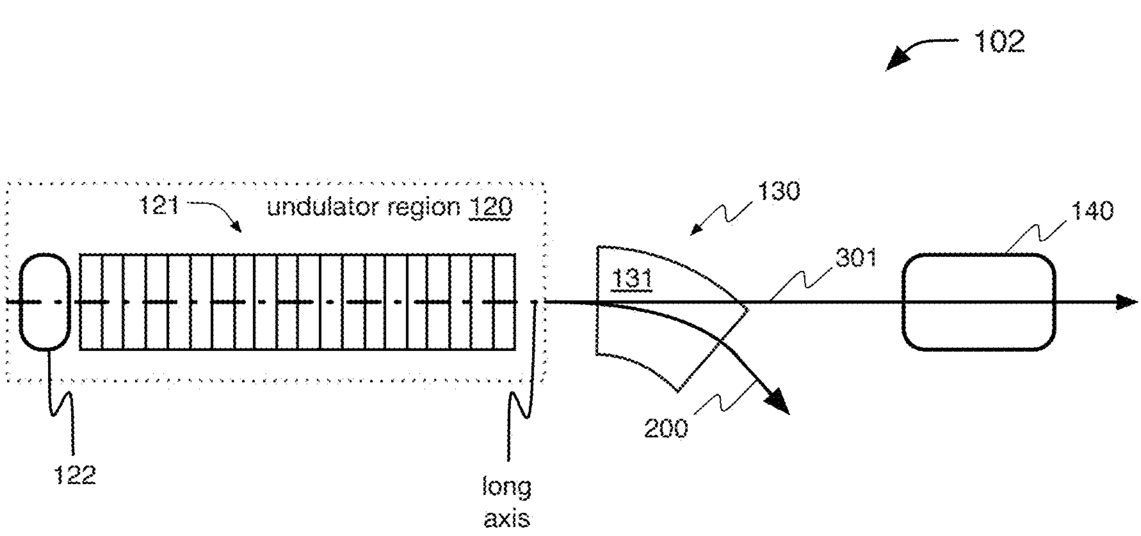
FIG. 2 is a schematic representation of an example of a radiator system.

The radiator system preferably includes one or more undulator regions 120, beam separators 130, and/or sets of optics 140 (e.g., as shown in FIG. 2). The radiator system is preferably configured to provide one or more electron beams to each of the one or more undulator regions. However, the radiator system can additionally or alternatively include any other suitable elements in any suitable arrangement.

2.2.1 Undulator Regions.

Each undulator region 120 preferably functions to produce light output (e.g., via free-electron lasing). The undulator region preferably includes a set of one or more undulators 121 and one or more beam modulators 122, and can optionally include one or more ancillary elements 129 (e.g., as shown by way of examples in FIGS. 4A-4F).

The set of undulators preferably includes one or more undulators 121 through which one or more electron beams 200 pass. In embodiments including more than one undulator, the undulators can be arranged contiguously (or substantially contiguously) or separate from each other (e.g., with one or more ancillary elements and/or beam modulators arranged between some of the undulators). The undulators can be substantially identical to each other or have different dimensions from one another, such as different lengths (along, or substantially along, the beam propagation direction) and/or widths (e.g., transverse, or substantially transverse, to the beam propagation direction). Any or all of the undulators can be configured to generate light having the same or different polarizations (e.g., linear polarizations of any suitable orientations, such as vertical and/or horizontal polarization; helical polarizations, such as left- and/or right-handed helical polarizations; elliptical polarizations of any suitable eccentricity, orientation, and/or handedness; etc.), such as described in more detail in U.S. patent application Ser. No. 18/374,911, filed 29 Sep. 2023 and titled "POLARIZATION-MULTIPLEXED RADIATOR SYSTEM, LIGHT SOURCE SYSTEM, AND METHOD OF OPERATION", which is herein incorporated in its entirety by this reference. However, the undulators can additionally or alternatively have any other suitable shapes, dimensions, configurations, and/or arrangements.

In embodiments in which the undulator region receives multiple electron beams, the set of undulators preferably causes each electron beam 200 to generate a separate (e.g., spatially-separated) light beam 301. In some such embodiments, it may be preferable for each such light beam 301 to have the same wavelength (or substantially the same wavelength, such as within 0.01, 0.02, 0.05, 0.1, 0.2, 0.3, 0.5, 0.75, 1, 1.5, 2, 3, 5, or 10%, within ±0.01, 0.02, 0.05, 0.1, 0.2, 0.3, 0.5, 0.75, or 1 nm, within any suitable open or closed interval bounded by one or more of the aforementioned values, etc.). In a first specific example, each light beam has a wavelength of approximately 13.5 nm (e.g., with a bandwidth and/or deviation within ±0.3 nm). In a second specific example, each light beam has a wavelength of approximately 6.7 nm (e.g., with a bandwidth and/or deviation within ±0.1 nm).

The undulator region preferably outputs the electron beam(s) 200 and the light beam(s) 301 to the beam separator 130. When output to the beam separator, each electron beam 200 is typically collinear (or substantially collinear) with the light beam 301 generated by it (but can alternatively have any other suitable relative arrangement).

The undulator region can optionally include one or more ancillary elements 129. The ancillary elements are preferably arranged along the beam path(s) (e.g., electron beam paths 200 and/or light beam paths 301). The ancillary elements can be arranged next to (e.g., between, upstream of, downstream of, etc.) the undulators 121 and/or can have any other suitable arrangement (e.g., within the undulator region 120). In some examples, the ancillary elements include one or more higher-order magnets, such as quadrupole magnets, sextupole magnets, and the like. The higher-order magnets can function to perform corrective focusing of the electron beams. In some examples, these magnets can be analogous to the higher-order magnets described above with respect to the electron splitter. Additionally or alternatively, the ancillary elements can include one or more diagnostics modules, which can function to characterize system operation (e.g., characterize the state of the electron beams and/or the light generated thereby).

Figures 4A, 4B, 4C:
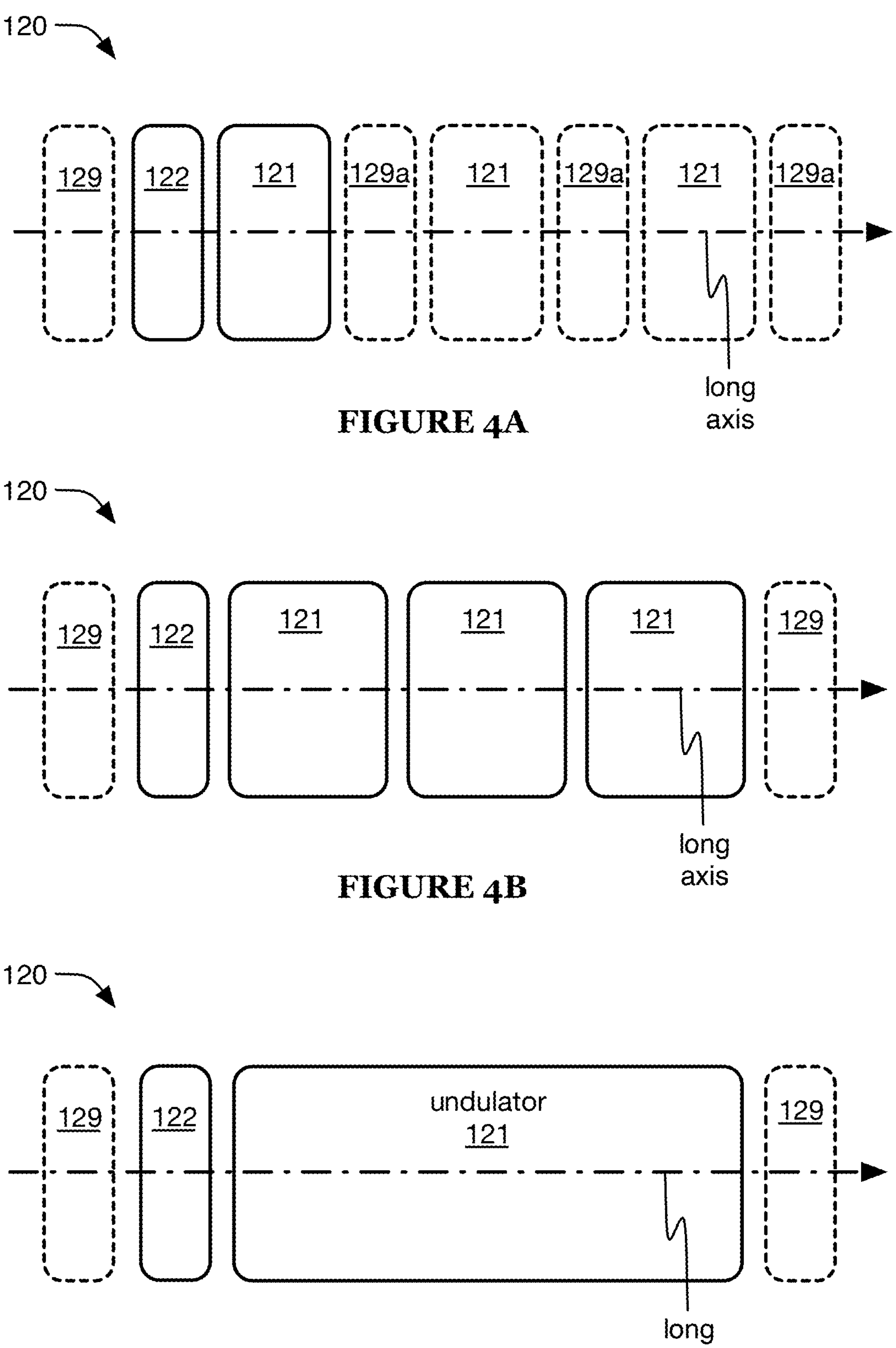
FIGS. 4A-4I are schematic representations of various examples of an undulator region of the radiator system.
Figure 4D:
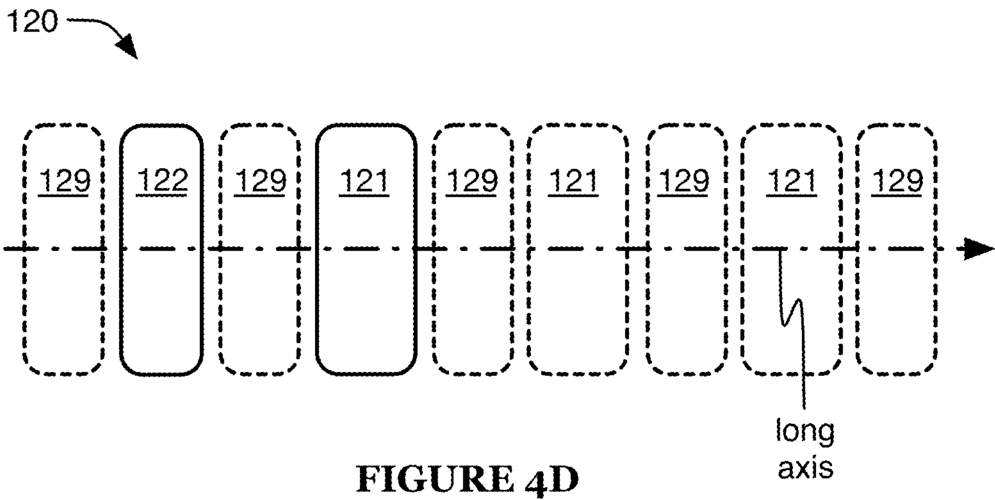
Figure 4E:
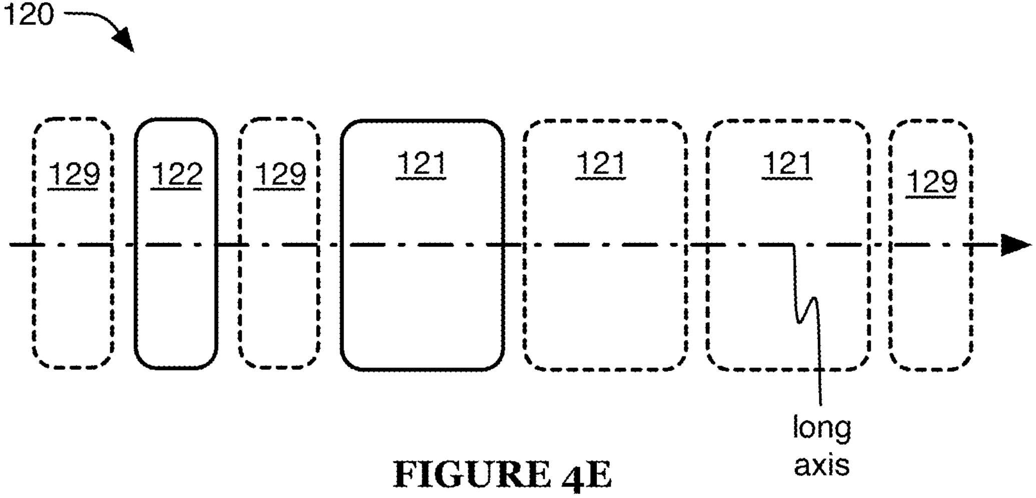
Figure 4F:
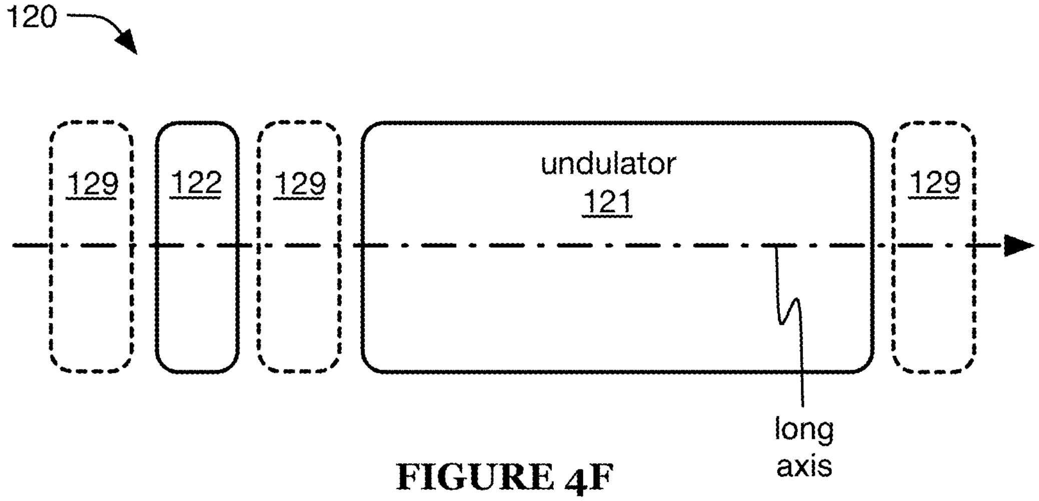
Figure 4G:
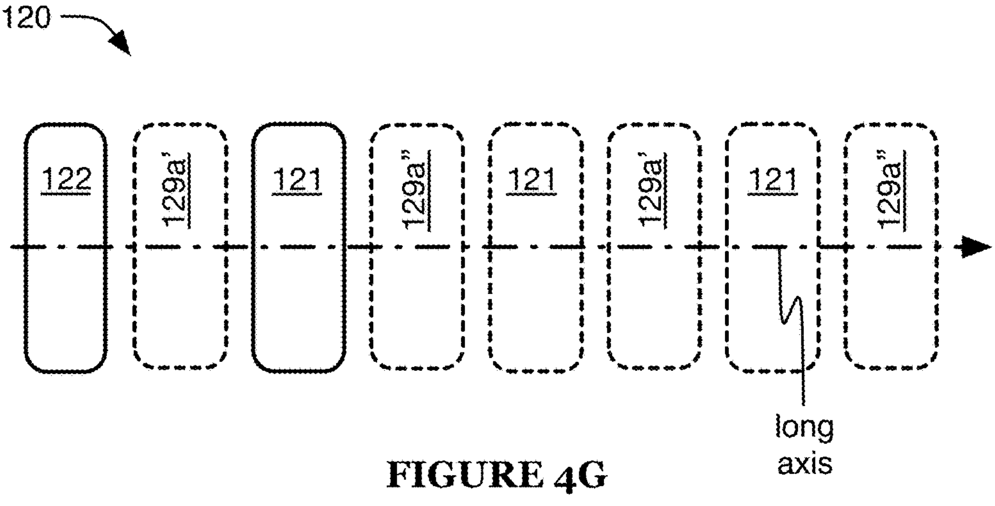
Figure 4H:
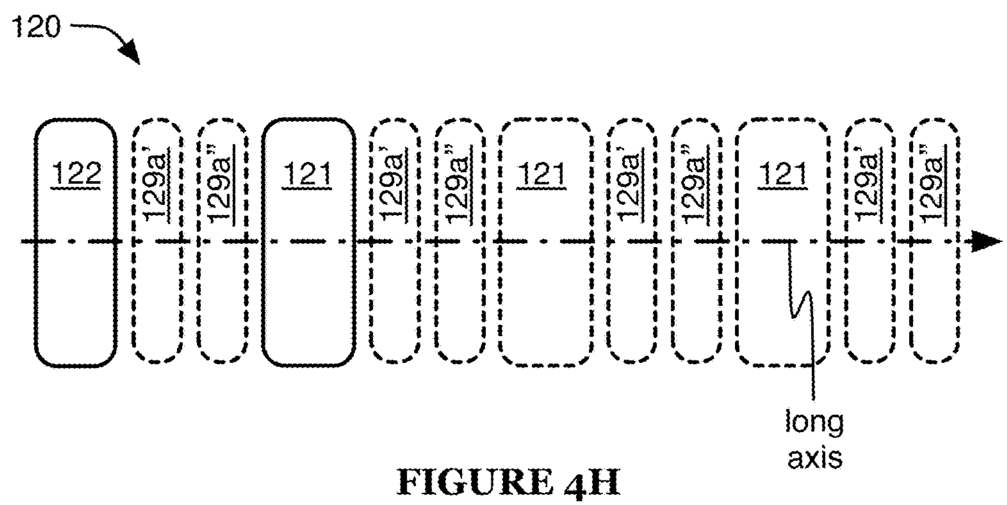
Figure 4I:
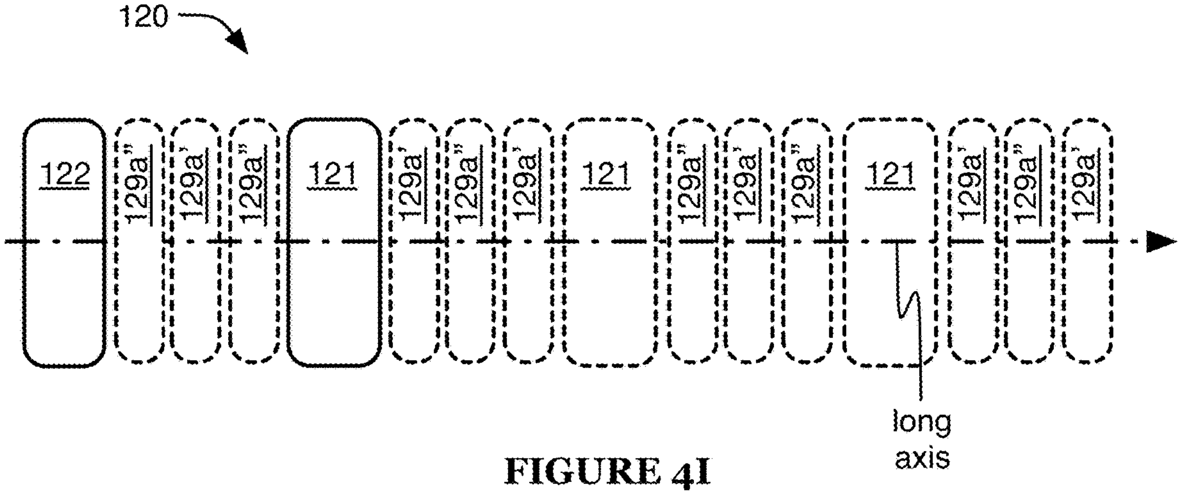

In some embodiments, the undulator region includes an arrangement of undulators 121 and quadrupole magnets 129*a* that define a focusing/defocusing (FODO) array. In a first example, the undulator region can include an alternating array of planar undulators (e.g., that focus the beam along a first transverse axis) and quadrupole magnets (e.g., that focus the beam along a second transverse axis orthogonal to the first while defocusing the beam along the first transverse axis), such as shown by way of example in FIG. 4D. In a second example, the undulator region can include (e.g., interspersed between and/or around the undulators, the beam modulator, and/or the other ancillary elements) quadrupole magnets of different polarities (e.g., alternating polarities), such as including a quadrupole magnets of a first polarity 129*a*' (e.g., that focus the beam along a first transverse axis while defocusing the beam along a second transverse axis orthogonal to the first) and quadrupole magnets of a second polarity 129*a*" (e.g., that focus the beam along the second transverse axis while defocusing the beam along the first transverse axis), such as shown by way of examples in FIGS. 4G-4I (e.g., wherein focusing effects from the undulators are insufficient to omit quadrupoles of both polarities). In a first specific example, one quadrupole is arranged between each undulator, preferably wherein the undulator polarities alternate (e.g., as shown in FIG. 4G). In a second specific example, two quadrupoles of opposing polarity are arranged between each undulator (e.g., as shown in FIG. 4H). In a third specific example, a quadrupole triplet is arranged between each undulator, preferably wherein the quadrupole polarities alternate between the different triplets (e.g., as shown in FIG. 4I). However, the FODO array can additionally or alternatively be defined in any other suitable manner.

The magnets of the undulator region can include fixed magnets (e.g., creating a substantially constant magnetic field), variable magnets (e.g., operable to alter the magnetic field that they create), and/or can any other suitable types of magnets.

The beam modulator 122 preferably functions to modulate the position and/or trajectory of the electron beam as it enters an undulator (e.g., the first undulator downstream of the beam modulator). By modulating the entry position and/or trajectory, the position and/or trajectory of the electron beam exiting the undulator region is also modulated (e.g., wherein the electron beam follows an oscillatory trajectory based on its entry position and direction). As most optical intensity in an FEL is generated near the end of the undulator region (e.g. in a final radiator undulator and/or the final length of one or more undulators), the overall optical output will typically be substantially collinear with the exiting electron beam (wherein this phenomenon may be referred to as "gain guiding").

The beam modulator is preferably arranged immediately (or substantially immediately) preceding an undulator (e.g., as shown by way of examples in FIGS. 4A-4C), but can alternatively be arranged farther upstream of the undulator. However, the undulator region (and/or the system as a whole) can additionally or alternatively include one or more beam modulators arranged between any suitable undulators of the undulator region (e.g., as long as at least one undulator is arranged downstream of each such modulator, as long as at least one such modulator is arranged upstream of at least one undulator, etc.). This can allow the beam modulator(s) to control the electron beam position within the final undulator, thereby enabling control over the optical output position and/or trajectory (e.g., via gain guiding).

The beam modulator is preferably operable to modulate the beam over a timeframe of approximately 1-1000 psec. For example, the beam modulator can be configured and/or configurable to modulate a series of electron bunches (e.g., hundreds to tens of thousands of electron bunches) pulsed at a frequency on the order of megahertz to gigahertz (e.g., tens to hundreds of MHz). However, the beam modulator can additionally or alternatively be operable to modulate the electron beam over any other suitable timeframes.

The beam modulator preferably includes one or more RF kickers (e.g., superconducting and/or non-superconducting RF kickers). For example, the beam modulator can include one or more kickers collectively operable to redirect the electron beam along two directions (e.g., two orthogonal or substantially orthogonal axes, preferably wherein both such axes are transverse or substantially transverse to the average beam direction, but alternatively wherein no such axes or only one such axis is transverse or substantially transverse to the average beam direction). However, the beam modulator 122 can additionally or alternatively include any other suitable modulators in any suitable arrangement.

Additionally or alternatively, the undulator region can include any other suitable elements in any suitable arrangement.

2.2.2 Beam Separators.

The radiator system preferably includes one or more beam separators 130 corresponding to (e.g., accepting one or more output beams from) each undulator region 120. For example, each undulator region can output one or more (substantially collinear) electron/light beam pairs to a beam separator (e.g., outputting all such pairs to the same beam separator, outputting subsets thereof to different beam separators, etc.).

The beam separator 130 preferably functions to separate the paths of the one or more electron beams 200 from the corresponding light beams 301. The beam separator preferably includes a separating dipole magnet 131, which preferably functions to bend each electron beam 200 away from the corresponding light beam 301 (e.g., as shown in FIG. 2).

The separating dipole preferably receives the one or more electron beams 200 and light beams 301 from the undulator region. The separating dipole preferably outputs the light beams 301 (e.g., to the optics 140), more preferably without substantially affecting the light beams in any manner. The separating dipole preferably outputs the electron beams 200 on different paths than the light beams 301.

The beam separator can optionally include one or more additional magnets, such as higher-order magnets, such as quadrupole magnets, sextupole magnets, and the like. The higher-order magnets can function to perform corrective focusing of the electron beams. In some examples, these magnets can be analogous to the higher-order magnets described above with respect to the electron splitter and/or the undulator region.

The magnets of the beam separator can include fixed magnets (e.g., creating a substantially constant magnetic field), variable magnets (e.g., operable to alter the magnetic field that they create), and/or can any other suitable types of magnets.

The beam separator can optionally output the electrons to the corresponding accelerator module 101 (e.g., to the energy recovery system and/or electron beam dump thereof). However, the beam separator 130 can additionally or alternatively include any other elements in any suitable arrangement.

2.2.3 Optics.

The radiator system 102 can optionally include one or more sets of optics 140 (e.g., as shown in FIG. 2). The optics can function to handle and/or manipulate the light beams 301. The optics preferably receive the one or more light beams from the beam separator 130. The optics can direct the light beams toward downstream equipment, such as wherein the optics direct each light beam toward a different element of downstream equipment for separate (e.g., independent) use. In one example, the optics direct the light beams toward one or more semiconductor fab tools, such as photolithography tools (e.g., steppers, scanners, etc.). However, the optics 140 can additionally or alternatively have any other suitable functionality.

Further, the radiator system 102 can additionally or alternatively include any other suitable elements in any suitable arrangement.

3. Method 3.1 Receiving a High-Energy Electron Beam.

Receiving a high-energy electron beam preferably functions to provide high-energy electrons for use in the light source system. The electron beam is preferably received at the undulator region. The electrons can be received as a single beam, as multiple beams, and/or in any other suitable form(s). The input electron beam (and/or other electron input) preferably includes a plurality of electron bunches, but can additionally or alternatively have any other suitable composition.

In some embodiments, the electrons can be received such as described in U.S. patent application Ser. No. 18/374,911, filed 29 Sep. 2023 and titled "POLARIZATION-MULTIPLEXED RADIATOR SYSTEM, LIGHT SOURCE SYSTEM, AND METHOD OF OPERATION", which is herein incorporated in its entirety by this reference; for example, receiving the high-energy electron beam (and/or any other suitable element(s) of the method) can include one or elements such as described in U.S. patent application Ser. No. 18/374,911 (e.g., as described regarding 'receiving high-energy electrons S310', 'separating electrons S320', and/or any other suitable elements).

However, the method can additionally or alternatively include receiving any other suitable electrons in any suitable manner.

3.2 Operating Beam Modulators.

Operating one or more beam modulators can include operating in an aperture synthesis mode, operating in a fixed beam mode, and/or operating the beam modulators in any other suitable modes.

Operating in an aperture synthesis mode preferably functions to generate a desired spatial pattern (e.g., desired for lithography applications, such as EUV lithography applications) in the optical output from the FEL (e.g., generate an optical output with a desired synthesized aperture), and can additionally or alternatively function to reduce and/or eliminate temporal coherence of the optical output (e.g., wherein such coherence may be undesirable for lithography applications, such as EUV lithography applications).

Operating in the aperture synthesis mode preferably includes (e.g., at one or more beam modulators) steering the electron beam to generate a desired spatial pattern in the resulting optical output. This preferably includes steering different electron pulses within the beam toward different locations. The beam modulator (or modulators) preferably directs the electron beam off-axis (e.g., creating lateral and/or angular displacement from a central axis defined by the undulator and/or undulator region) at or near the entry to the downstream undulator. This off-axis entry alignment typically also results in an off-axis alignment of the exiting electron beam (e.g., due to betatron oscillation and/or other movement of the beam within the FODO array defined by the undulator region), and thus of the resulting optical output (e.g., assuming the desired gain guiding behavior is in effect within the FEL); the amount and/or nature of the output trajectory of the exiting beam can depend on the input trajectory (e.g., amount and/or direction of lateral and/or angular displacement from the central axis), the betatron oscillation period, and/or the length of the one or more undulators traversed by the electron beam between the input and output points (e.g., as shown by way of examples in FIGS. 6A-6D, wherein FIGS. 6A-6B show output trajectories with angular displacement from the central axis but no lateral displacement, and wherein FIGS. 6C-6D show output trajectories with lateral displacement from the central axis but no angular displacement). The alignment of the off-axis trajectory (e.g., at any or all points along the electron beam path within the undulator region) is preferably limited to a deviation of tens of microradians relative to the central axis (e.g., limited to less than 20 prad), which can function to limit efficiency losses and/or to ensure effective gain guiding. However, the beam modulators can additionally or alternatively steer the electron beam in any other suitable manner.

Figure 5A:
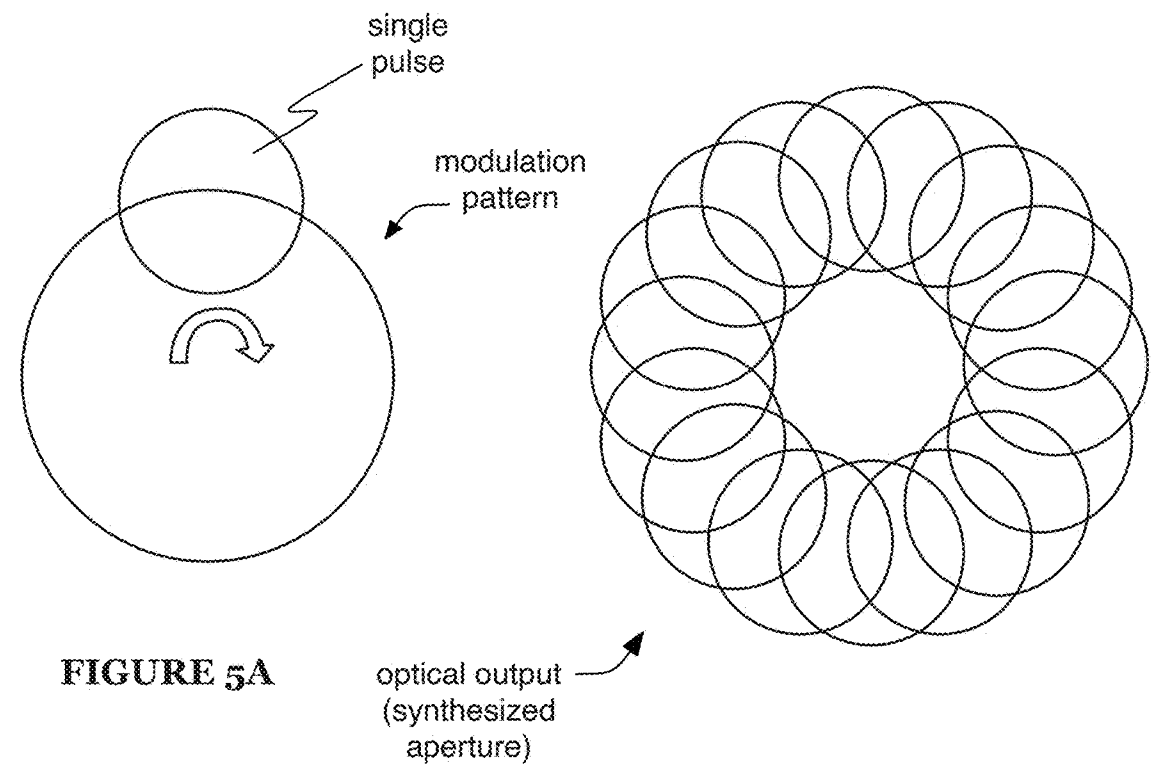
FIGS. 5A-5B are schematic representation of a first and second example, respectively, of operating a beam modulator in a synthesized aperture mode.

In a first example, the beam modulators steer the beam in an annular pattern (e.g., having reduced intensity at and/or near the center, as compared with a higher-intensity region surrounding that reduced intensity center). For example, the beam can be steered in a circular pattern (e.g., by sinusoidal modulation along two orthogonal transverse axes, with the modulation along one transverse axis being 90° out of phase from the other), and/or can be directed in any other suitable manner to result in a circular (and/or any other suitable annular) intensity pattern of the resulting optical output (e.g., as shown by way of example in FIG. 5A). A person of skill in the art will recognize that the term "annular" as used here is not necessarily limited to a rounded or circular shape, but can analogously apply to any suitable shape with a hole (or analogously, region of zero intensity, substantially zero intensity, or reduced intensity) in or near the middle of itself, preferably surrounded (or substantially surrounded, partially surrounded, etc.) by a higher-intensity perimeter; in examples, this could include a complete perimeter (e.g., square, rectangular, hexagonal, irregular, etc.) or a partial perimeter (e.g., perforated perimeter, truncated perimeter such as a 'C' or 'U' shaped perimeter, half perimeter such as a semicircular perimeter, etc.) surrounding a region of zero or reduced intensity.

Figure 5B:
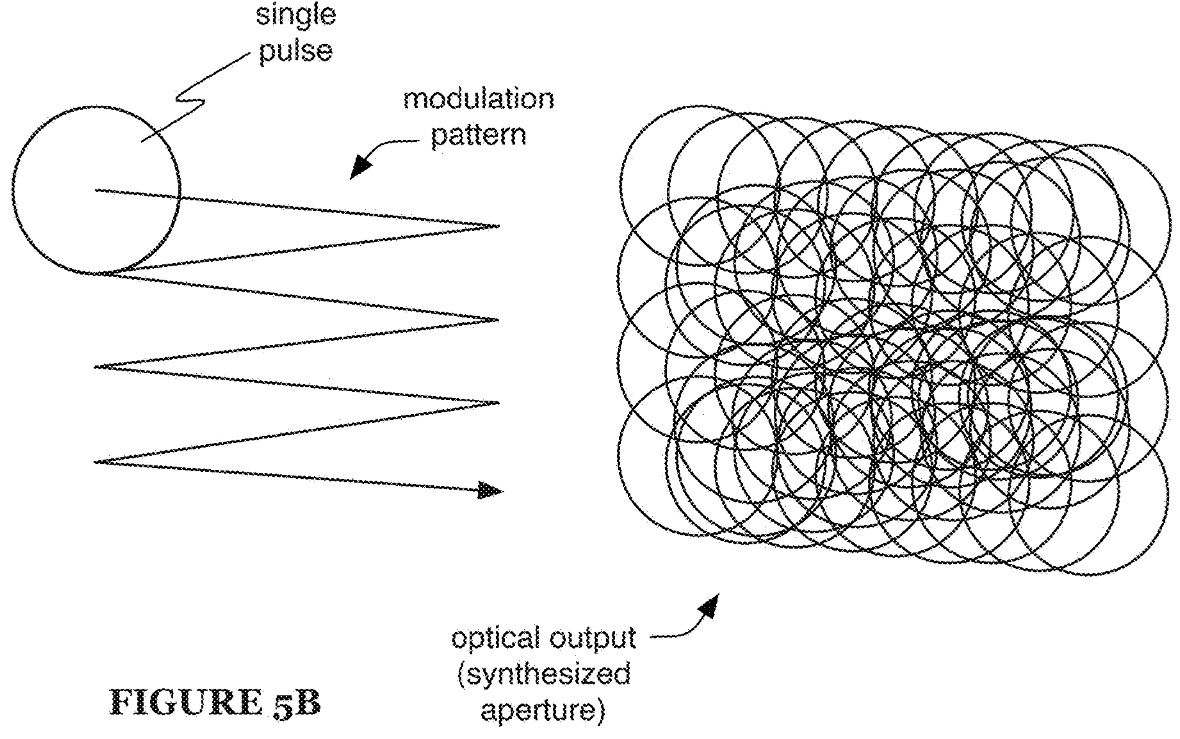

In a second example, the beam modulators steer the electron beam in a top hat pattern (and/or steer the electron beam in a manner that generates a top hat pattern in the resulting optical output), such as shown by way of example in FIG. 5B. In a specific example, the electron beam is driven in a square pattern, such as being driven using triangular and/or sawtooth modulation along each of two orthogonal transverse axes, wherein the modulation along the two axes is performed with differing periods (e.g., wherein one such period is an integer multiple, or substantially equal to an integer multiple, of the other period). In this specific example (and/or in any other suitable examples in which the modulation periods differ significantly between the two directions of beam modulation), it may be possible to employ different technologies (e.g., supporting different modulation speeds) for modulating the beam in the two different directions; however, any suitable modulation technologies can be employed for any such roles.

Operating in the aperture synthesis mode can additionally or alternatively include operating the beam modulators in any other suitable manner. Further, operating in the aperture synthesis mode can additionally or alternatively include generating any other suitable spatial and/or temporal patterns (e.g., in the electron beam and/or optical output).

Operating the beam modulators in a fixed beam mode preferably does not include dynamically modulating the electron beam. In examples, operating in the fixed beam mode can instead include steering the electron beam in a static or pseudo-static manner, not steering the electron beam at the beam modulators, and/or operating in any other suitable manner.

However, the method can additionally or alternatively include operating the beam modulators in any other suitable modes.

3.3 Providing an Optical Output.

Providing an optical output preferably functions to provide one or more light beams (e.g., for use at one or more endpoints, such as scanners, other photolithography tools, elements of a semiconductor fabrication plant, etc.). Providing the optical output preferably includes generating the optical output, and can optionally include separating the outputs, providing the optical output, and/or outputting electrons. However, providing the optical output can additionally or alternatively include any other suitable elements performed in any suitable manner.

The light beams preferably have short wavelengths (e.g., EUV light). In embodiments in which multiple light beams are generated, each such light beam preferably has a substantially equal wavelength. However, the light beams can additionally or alternatively have any other suitable wavelengths. The light beams are preferably generated at a set of one or more undulators (e.g., as described above in more detail regarding the undulator region). Each light beam is preferably generated via free-electron lasing from one or more of the electron beams (e.g., generated as the electron beam traverses the undulator(s)). The optical output is preferably generated via free-electron lasing from the electron beam(s) within the undulator region, but can additionally or alternatively be generated in any other suitable manner.

After generation, the light beam(s) can optionally be separated from the electron beam(s). Separating the light beams from the electron beams is preferably performed at one or more redirectors, such as at a magnet element thereof (e.g., separating dipole magnet). The redirector preferably receives the electron beam(s) and light beam(s) and redirects the electron beams (e.g., without affecting the light beams), thereby separating each electron beam from the light beam that it generated (wherein the light beam will typically share a trajectory with the electron beam until this separation occurs). After separation, the beam separator preferably outputs the light beam(s) at a light output.

After separation, the electrons can optionally be output, which can function to provide the electrons to the accelerator system (e.g., to an energy recovery system thereof) and/or to any other suitable system configured to accept the electrons after their use in the light source system. In some examples, the electrons can then be used by the accelerator system (e.g., to be cycled through the accelerator again and provided to the light source system as one or more beams of high-energy electrons, thus enabling repetition of the method and/or any suitable elements thereof). However, the method can additionally or alternatively include outputting electrons in any other suitable manner.

In some embodiments, providing the optical output can be performed such as described in U.S. patent application Ser. No. 18/374,911, filed 29 Sep. 2023 and titled "POLARIZATION-MULTIPLEXED RADIATOR SYSTEM, LIGHT SOURCE SYSTEM, AND METHOD OF OPERATION", which is herein incorporated in its entirety by this reference; for example, providing the optical output (and/or any other suitable element(s) of the method) can include one or elements such as described in U.S. patent application Ser. No. 18/374,911 (e.g., as described regarding 'generating optical outputs S330', 'separating outputs S340', 'providing optical outputs S350', 'outputting electrons S360', and/or any other suitable elements).

However, the method can additionally or alternatively include generating any suitable optical outputs in any suitable manner.

In some examples, the method includes: at a beam modulator (e.g., including one or more RF kickers operable to redirect electron bunches along one or more axes, such as axes substantially orthogonal to each other and/or to the input trajectory), at a first time, receiving a first electron bunch traversing an input trajectory; at an undulator, receiving the first electron bunch after the first time, wherein: the first electron bunch traverses a first electron trajectory through a cavity of the undulator; and the first electron bunch generates a first optical output within the cavity via free-electron lasing, wherein the first optical output exits the cavity along a first optical trajectory; at the beam modulator: at a second time after the first time, receiving second electron bunch substantially traversing the input trajectory; and at a third time after the second time, deflecting the second electron bunch onto a second electron trajectory through the cavity, the second electron trajectory substantially different from the first electron trajectory; and at the undulator, receiving the second electron bunch after the third time, wherein: the second electron bunch traverses the second electron trajectory (e.g., while undergoing betatron oscillation within the cavity); and the second electron bunch generates a second optical output within the cavity via free-electron lasing, wherein the second optical output exits the cavity along a second optical trajectory substantially different from the first optical trajectory. In some such examples, the method can additionally or alternatively include receiving one or more additional electron bunches (e.g., substantially traversing the same input trajectory), redirecting one or more such additional electron bunches at the beam modulator (e.g., such that they traverse one or more different electron trajectories within the cavity, such that the optical outputs generated by free-electron lasing from each such additional electron bunch exit the cavity along different optical trajectories, etc.), and/or generating one or more additional optical outputs via free-electron lasing from each of the one or more additional electron bunches (or from any suitable subset thereof). As described above, the pattern defined by this plurality of optical outputs can be much greater in size (e.g., cross-sectional area) than any of the individual optical outputs, can be designed for compatibility with one or more endpoints (e.g., photolithographic scanners), and/or can have any other suitable characteristics.

However, the method can additionally or alternatively include any other suitable elements performed in any suitable manner. Further, the method can optionally include repeating any or all method elements described above (e.g., continuously, periodically, sporadically, and/or with any other suitable timing). For example, the method can include continuously or substantially performing all of the method elements described above (and/or any suitable subset thereof), which can enable continuous or substantially continuous light output.

4. Exemplary Embodiments

A numbered list of specific examples of the technology described herein are provided below. A person of skill in the art will recognize that the scope of the technology is not limited to and/or by these specific examples.

1. A method for providing optical outputs, the method comprising:
   directing a series of electron bunches substantially along an input trajectory to a beam modulator, the electron bunches of the series temporally separated from each other;
   at the beam modulator, directing each electron bunch of the series onto a different electron trajectory through a cavity of an undulator;
   at the undulator, generating a plurality of optical outputs via free-electron lasing, comprising imposing a spatially-periodic electromagnetic field within the cavity such that:
   each electron bunch of the series undergoes betatron oscillation within the cavity; and
   each electron bunch of the series generates a respective optical output of the plurality via free-electron lasing, wherein each optical output is generated having a different optical trajectory.
2. The method of Specific Example 1, wherein:
   the plurality of optical outputs define a plurality of beam areas, wherein, for each optical output of the plurality, an intersection of the optical output with a reference plane defines a respective beam area of the plurality;
   a greatest beam area of the plurality is no lesser than each other beam area of the plurality; and
   an intersection of the plurality of optical outputs with the reference plane defines a pattern area substantially greater than the greatest beam area.
3. The method of Specific Example 2, wherein the pattern area is greater than twice the greatest beam area.
4. The method of Specific Example 2, wherein the pattern area is greater than ten times the greatest beam area.

5. The method of any of the preceding specific examples, further comprising:

directing a second series of electron bunches substantially along the input trajectory to the beam modulator, the electron bunches of the second series temporally separated from each other;

at the beam modulator, directing each electron bunch of the second series onto a different electron trajectory through the cavity;

at the undulator, generating a second plurality of optical outputs via free-electron lasing, comprising imposing the spatially-periodic electromagnetic field within the cavity such that:

each electron bunch of the second series undergoes betatron oscillation within the cavity; and each electron bunch of the second series generates a respective optical output of the second plurality via free-electron lasing, wherein each optical output is generated having a different optical trajectory.

6. The method of Specific Example 5, wherein:

the plurality of optical outputs defines a spatial pattern; and the second plurality of optical outputs defines a second spatial pattern substantially identical to the spatial pattern.

7. The method of any of the preceding specific examples, wherein an intersection of the plurality of optical outputs with a reference plane defines an annular pattern (e.g., having an elliptical or substantially elliptical perimeter, such as a circular or substantially circular perimeter; having a quadrilateral or substantially quadrilateral perimeter, such as a rectangular or substantially rectangular perimeter, a perimeter defining or substantially defining a parallelogram, a trapezoidal or substantially trapezoidal perimeter, etc.; having any other suitable perimeter).

8. The method of Specific Example 7, wherein for each optical output of the plurality, an intersection of the optical output with the reference plane defines a substantially elliptical cross-section (e.g., circular cross-section, substantially circular cross-section such as an elliptical cross-section with very low eccentricity, any other suitable elliptical or substantially elliptical cross-section, etc.).

9. The method of any of the preceding specific examples, wherein the beam modulator comprises one or more radio frequency (RF) kickers operable to redirect electron bunches along a first axis and a second axis orthogonal to the first axis, wherein the first and second axis are substantially orthogonal to the input trajectory at the beam modulator.

10. The method of Specific Example 9, wherein directing each electron bunch of the series onto a different electron trajectory comprises, at the one or more RF kickers:

redirecting a first electron bunch of the series by a first amount along the first axis; and redirecting a second electron bunch of the series by a second amount along the first axis and by a third amount along the second axis, wherein the second amount is less than the first amount and the third amount is less than the first amount.

11. The method of Specific Example 10, wherein the square of the first amount is substantially equal to a sum of the square of the second amount and the square of the third amount.

12. The method of Specific Example 11, further comprising redirecting a third electron bunch of the series by a fourth amount along the first axis and by a fifth amount along the second axis, wherein the square of the first amount is substantially equal to a sum of the square of the fourth amount and the square of the fifth amount.

13. The method of Specific Example 12, wherein the first electron bunch is redirected along the first axis in a first direction, wherein the third electron bunch is redirected along the first axis in a second direction opposing the first direction.

14. The method of Specific Example 10, further comprising redirecting a third electron bunch of the series by the first amount along the second axis.

15. The method of any of the preceding specific examples, wherein the beam modulator comprises a radio frequency (RF) kicker operable to redirect electron bunches along a first axis, wherein directing each electron bunch of the series onto a different electron trajectory comprises, at the RF kicker, redirecting a first electron bunch of the series along the first axis.

16. The method of Specific Example 15, wherein the first axis is substantially orthogonal to the input trajectory at the beam modulator.

17. The method of Specific Example 16, wherein the beam modulator further comprises a second RF kicker operable to redirect electron bunches along a second axis orthogonal to the first axis and substantially orthogonal to the input trajectory at the beam modulator, wherein directing each electron bunch of the series onto a different electron trajectory further comprises, at the second RF kicker, redirecting a second electron bunch of the series along the second axis.

18. The method of Specific Example 15 or 16, wherein the RF kicker is further operable to redirect electron bunches along a second axis orthogonal to the first axis, wherein directing each electron bunch of the series onto a different electron trajectory further comprises, at the RF kicker, redirecting a second electron bunch of the series along the second axis.

19. The method of any of the preceding specific examples, wherein:

an intersection of the plurality of optical outputs with a reference plane defines a substantially rectangular pattern; and for each optical output of the plurality, an intersection of the optical output with the reference plane defines a substantially elliptical cross-section.

20. The method of any of the preceding specific examples, further comprising providing the plurality of optical outputs to a photolithographic scanner.

21. A system configured to perform the method of any of the preceding specific examples.

22. The system of Specific Example 21, comprising a beam modulator and an undulator.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for providing optical outputs, the method comprising:

directing a series of electron bunches substantially along an input trajectory to a beam modulator, the electron bunches of the series temporally separated from each other;

at the beam modulator, directing each electron bunch of the series onto a different electron trajectory through a cavity of an undulator;

at the undulator, generating a plurality of optical outputs via free-electron lasing, comprising imposing a spatially-periodic electromagnetic field within the cavity such that:

each electron bunch of the series undergoes betatron oscillation within the cavity; and each electron bunch of the series generates a respective optical output of the plurality via free-electron lasing, wherein each optical output is generated having a different optical trajectory.

2. The method of claim 1, wherein:

the plurality of optical outputs define a plurality of beam areas, wherein, for each optical output of the plurality of optical outputs, an intersection of the optical output with a reference plane defines a respective beam area of the plurality of beam areas;

a greatest beam area of the plurality of beam areas is no lesser than each other beam area of the plurality of beam areas; and an intersection of the plurality of optical outputs with the reference plane defines a pattern area substantially greater than the greatest beam area.

3. The method of claim 2, wherein the pattern area is greater than twice the greatest beam area.

4. The method of claim 2, wherein the pattern area is greater than ten times the greatest beam area.

5. The method of claim 1, further comprising:

directing a second series of electron bunches substantially along the input trajectory to the beam modulator, the electron bunches of the second series temporally separated from each other;

at the beam modulator, directing each electron bunch of the second series onto a different electron trajectory through the cavity;

at the undulator, generating a second plurality of optical outputs via free-electron lasing, comprising imposing the spatially-periodic electromagnetic field within the cavity such that:

each electron bunch of the second series undergoes betatron oscillation within the cavity; and each electron bunch of the second series generates a respective optical output of the second plurality via free-electron lasing, wherein each optical output is generated having a different optical trajectory.

6. The method of claim 5, wherein:

the plurality of optical outputs defines a spatial pattern; and the second plurality of optical outputs defines a second spatial pattern substantially identical to the spatial pattern.

7. The method of claim 1, wherein an intersection of the plurality of optical outputs with a reference plane defines an annular pattern.

8. The method of claim 7, wherein for each optical output of the plurality, an intersection of the optical output with the reference plane defines a substantially elliptical cross-section.

9. The method of claim 7, wherein the beam modulator comprises one or more radio frequency (RF) kickers operable to redirect electron bunches along a first axis and a second axis orthogonal to the first axis, wherein the first and second axis are substantially orthogonal to the input trajectory at the beam modulator.

10. The method of claim 9, wherein directing each electron bunch of the series onto a different electron trajectory comprises, at the one or more RF kickers:

redirecting a first electron bunch of the series by a first amount along the first axis; and redirecting a second electron bunch of the series by a second amount along the first axis and by a third amount along the second axis, wherein the second amount is less than the first amount and the third amount is less than the first amount.

11. The method of claim 10, wherein the square of the first amount is substantially equal to a sum of the square of the second amount and the square of the third amount.

12. The method of claim 11, further comprising redirecting a third electron bunch of the series by a fourth amount along the first axis and by a fifth amount along the second axis, wherein the square of the first amount is substantially equal to a sum of the square of the fourth amount and the square of the fifth amount.

13. The method of claim 12, wherein the first electron bunch is redirected along the first axis in a first direction, wherein the third electron bunch is redirected along the first axis in a second direction opposing the first direction.

14. The method of claim 10, further comprising redirecting a third electron bunch of the series by the first amount along the second axis.

15. The method of claim 1, wherein the beam modulator comprises a radio frequency (RF) kicker operable to redirect electron bunches along a first axis, wherein directing each electron bunch of the series onto a different electron trajectory comprises, at the RF kicker, redirecting a first electron bunch of the series along the first axis.

16. The method of claim 15, wherein the first axis is substantially orthogonal to the input trajectory at the beam modulator.

17. The method of claim 16, wherein the beam modulator further comprises a second RF kicker operable to redirect electron bunches along a second axis orthogonal to the first axis and substantially orthogonal to the input trajectory at the beam modulator, wherein directing each electron bunch of the series onto a different electron trajectory further comprises, at the second RF kicker, redirecting a second electron bunch of the series along the second axis.

18. The method of claim 15, wherein the RF kicker is further operable to redirect electron bunches along a second axis orthogonal to the first axis, wherein directing each electron bunch of the series onto a different electron trajectory further comprises, at the RF kicker, redirecting a second electron bunch of the series along the second axis.

19. The method of claim 1, wherein:

an intersection of the plurality of optical outputs with a reference plane defines a substantially rectangular pattern; and for each optical output of the plurality, an intersection of the optical output with the reference plane defines a substantially elliptical cross-section.

20. The method of claim 1, further comprising providing the plurality of optical outputs to a photolithographic scanner.

* * * * *